(12) United States Patent
Naruse

(10) Patent No.: US 8,882,424 B2
(45) Date of Patent: Nov. 11, 2014

(54) SCREW FALL PREVENTING STRUCTURE

(71) Applicant: Kunihiko Naruse, Toyokawa (JP)

(72) Inventor: Kunihiko Naruse, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 93 days.

(21) Appl. No.: 13/658,951

(22) Filed: Oct. 24, 2012

(65) Prior Publication Data

US 2013/0108397 A1    May 2, 2013

(30) Foreign Application Priority Data

Oct. 27, 2011    (JP) .................................. 2011-235940

(51) Int. Cl.
*F16B 41/00*    (2006.01)

(52) U.S. Cl.
USPC ......................................... 411/352; 411/999

(58) Field of Classification Search
USPC .................. 411/353, 999, 530, 134–136, 352
IPC .............................................. F16B 41/00,39/10
See application file for complete search history.

(56) References Cited

U.S. PATENT DOCUMENTS

| | | | | |
|---|---|---|---|---|
| 1,997,821 A | * | 4/1935 | Gzupkaytie | 301/35.624 |
| 2,301,786 A | * | 11/1942 | Millermaster | 174/51 |
| 3,263,728 A | * | 8/1966 | Lynch | 411/349 |
| 3,602,284 A | * | 8/1971 | Smith et al. | 411/352 |
| 4,899,197 A | * | 2/1990 | Davis et al. | 399/326 |
| 5,174,702 A | * | 12/1992 | Dolin | 411/102 |
| 5,305,065 A | * | 4/1994 | Hoover et al. | 399/114 |
| 5,475,564 A | * | 12/1995 | Chiou | 361/704 |
| 6,163,666 A | | 12/2000 | Hosokawa et al. | |
| 7,567,770 B2 | * | 7/2009 | Ahl et al. | 399/121 |
| 2009/0263155 A1 | | 10/2009 | Murano | |

FOREIGN PATENT DOCUMENTS

| | | |
|---|---|---|
| CN | 1122202 C | 9/2003 |
| JP | S57-184311 | 11/1982 |
| JP | S61-30715 | 2/1986 |
| JP | S63-91716 | 6/1988 |
| JP | 11-143257 A | 5/1999 |

(Continued)

OTHER PUBLICATIONS

Japanese Office Action (Notification of Reasons for Refusal) dated Aug. 27, 2013, issued in the corresponding Japanese Patent Application No. 2011-235940, and an English Translation thereof. (3 pgs).

(Continued)

*Primary Examiner* — Gary Estremsky
(74) *Attorney, Agent, or Firm* — Buchanan Ingersoll & Rooney PC

(57) ABSTRACT

A screw fall preventing structure prevents a screw from falling out of a unit that is attachable to and removable from a main body of an apparatus. The screw is used for fastening the unit to the main body of the apparatus. The screw fall preventing structure includes: a wire piece having a bent portion fitted around the screw to hold the screw axially rotatably; and a fixing member fixing the wire piece to the unit. When the unit is not fastening by the screw, the screw is elastically supported via the wire piece on the fixing member and the elasticity is given by a portion of the wire between a portion fixed by the fixing member and the bent portion.

12 Claims, 7 Drawing Sheets

(56) References Cited

FOREIGN PATENT DOCUMENTS

| | | |
|---|---|---|
| JP | 2001-175114 A | 6/2001 |
| JP | 2005-308153 A | 11/2005 |
| JP | 2006-284875 A | 10/2006 |
| JP | 2007-079488 A | 3/2007 |
| JP | 2007-224994 A | 9/2007 |
| JP | 2008-133900 A | 6/2008 |
| JP | 2009-258457 A | 11/2009 |
| JP | 2010-121708 A | 6/2010 |

OTHER PUBLICATIONS

Chinese Office Action issued Jun. 19, 2014, by the Chinese Patent Office in corresponding Chinese Patent Application No. 201210415502 with English translation (19 pages).

* cited by examiner

SCREW FALL PREVENTING STRUCTURE

This application is based on application No. 2011-235940 filed in Japan, the contents of which are hereby incorporated by reference.

BACKGROUND OF THE INVENTION (1) Field of the Invention

The present invention relates to structures for preventing fall of screws, and in particular to a structure for preventing fall of a screw that is used to secure a removable unit to a main body of an apparatus.

(2) Description of the Related Art

For example, image forming apparatuses, such as copiers and printers, for forming images by electrophotography have a fusing device for thermally fusing toner images onto a recording sheet. For easy maintenance, it is typical to unitize the fusing device as a unit that is removable from the main body of the apparatus.

Such a fusing unit is secured to the apparatus by fastening a frame of the fusing unit (hereinafter, simply "unit frame") to a frame of the apparatus (hereinafter, simply "main-body frame") using screws. The main-body frame has a tapped hole in a mounting surface for the unit, whereas the unit frame has a through hole (hereinafter "insertion hole") that is larger in diameter than the outer diameter (nominal diameter) of the screw. By passing the screw through the insertion hole and then fastening the screw into the tapped hole to make thread engagement, the unit frame is firmly sandwiched between the screw head and the mounting surface. As a result, the fusing unit is secured to the apparatus.

To remove the fusing unit from the apparatus, first, the screw is loosened to disengage the screw from the main-body frame. At this time, it is required to hold the screw with fingers, for example, in order to prevent the screw from falling out of the insertion hole. However, the space available around the part subject to the fastening is often very limited. Therefore, it may be difficult to reliably hold the screw with fingers. Furthermore, holding the screw with fingers may not be possible at all, in the case, for example, where the fusing unit was in use until a moment before the removal and thus the screw is hot.

In view of the above, a fall preventing washer has conventionally been used to prevent the screw from falling. Typically, a fall preventing washer is an annular plate having slits extending radially outwardly from the inner edge defining a hole. Thus, a tongue-like portion is formed between each adjacent slits which is flexible to allow for resilient flexure in the direction perpendicular to the diametrical direction of the hole. In addition, the diameter of the hole is set to be slightly smaller than the outer diameter (nominal diameter) of the screw.

The fall preventing washer having such a configuration is fitted over the shank of the screw that is inserted through the insertion hole. As the fall preventing washer is fitted over the shank, the tongue-like portions of the fall preventing washer are flexed to enlarge the hole, and the screw is retained in place by the resilient force. Once the screw is assembled to the fall preventing washer and fastened to secure the unit frame to the main-body frame, the screw remains attached to the unit frame even after the unit frame is detached from the main-body frame. This is because, as the unit frame is sandwiched between the screw head and the fall preventing washer. In this way, the screw is prevented from falling out of the unit frame (insertion hole).

Unfortunately, however, the fall preventing washer involves a risk in the case where the axis of the screw is not in precise alignment with the axis of the tapped hole at the time of attaching the fusing unit to the main body of the apparatus. In such a case, the end of the screw may abut against the peripheral wall of the tapped hole and may be fastened in a state where the screw is inclined with the point supported by the fall preventing washer as its center. In that case, the screw is inserted into the tapped hole at an angle, resulting in damaging the threads of the tapped hole and thus making future removable or attachment of the fusing unit difficult. In addition, there is another risk involved in the case where the fusing unit has been removed from the apparatus. If any object accidently hits the unit frame at a location near the screw, which projects from the insertion hole of the unit frame, the screw may be pushed out of the fall preventing washer with great impetus and may fall from the unit frame (fusing unit).

The problems described above are not specific to image forming apparatuses and may arise commonly for any device including a removable unit attached to the main body of the device by fastening screws.

SUMMARY OF THE INVENTION

In view of the above problems, the present invention aims to provide a screw fall preventing structure with which the problems associated with the conventional fall preventing washer are solved to the greatest extent practicable.

A screw fall preventing structure according to the present invention prevents a screw from falling out of a unit that is attachable to and removable from a main body of an apparatus. The screw is used for fastening the unit to the main body of the apparatus. The screw fall preventing structure includes: a wire piece having a bent portion fitted around the screw to hold the screw axially rotatably; and a fixing member fixing the wire piece to the unit. When the unit is not fastening by the screw, the screw is elastically supported via the wire piece on the fixing member and the elasticity is given by a portion of the wire between a portion fixed by the fixing member and the bent portion.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

The following describes a screw fall preventing structure according to the present invention by way of an example directed to a screw used to secure a fusing unit to the main body of a printer.

Overall Structure of Printer

Figure 1:
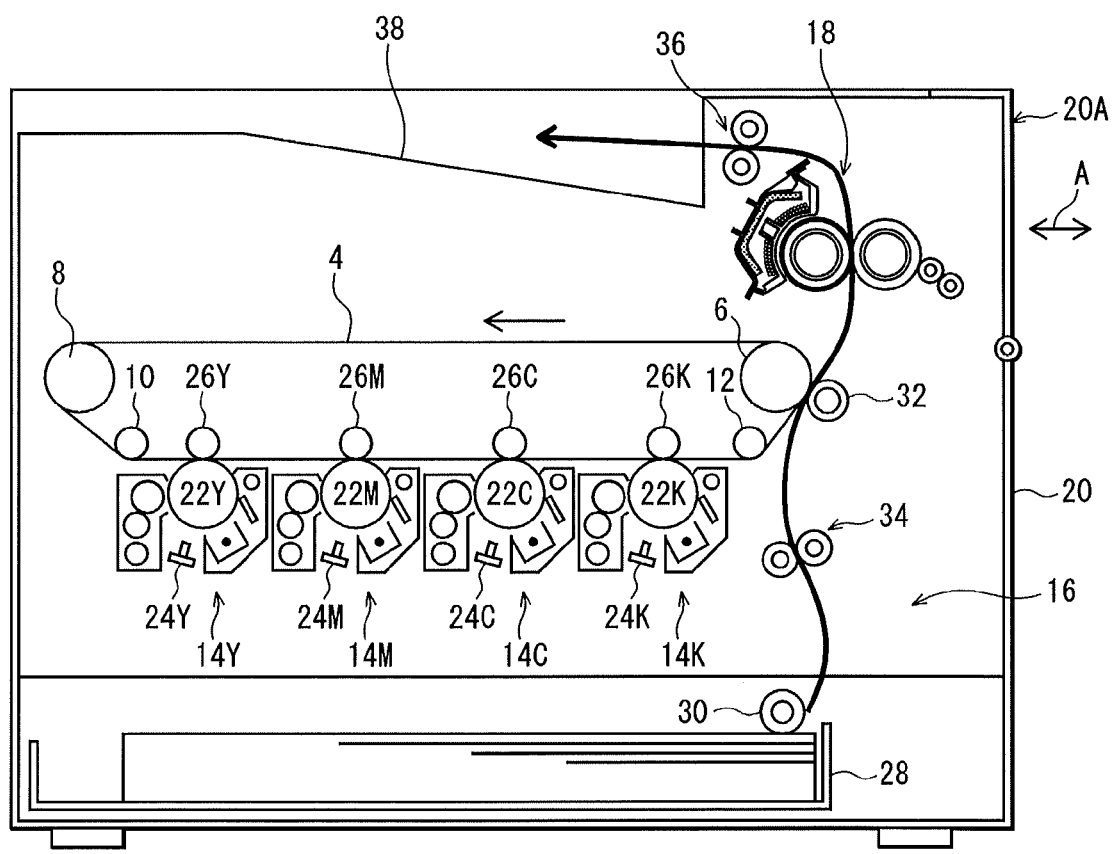
FIG. 1 is a view showing a schematic structure of a tandem-type full color printer.

FIG. 1 is a view showing a schematic structure of a tandem-type full color printer 2 (hereinafter, simply "printer 2").

The printer 2 forms an image by well-known electrophotography and includes: a transfer belt 4; a drive roller 6, a passive roller 8, and a pair of backup rollers 10 and 12 around which the transfer belt 4 is wound in taut condition; image creating units 14Y, 14M, 14C, and 14K disposed to face the transfer belt 4 and at predetermined intervals along the running direction of the transfer belt 4; a sheet feeder device 16 for feeding a recording sheet; a fusing unit 18; and a housing 20 housing all of these components.

Each of the image creating units 14Y . . . 14K (i.e., 14Y through 14K) includes an image carrier, which is a corresponding one of photoconductive drums 22Y, 22M, 22C, and 22K, and a corresponding one of LED arrays 24Y, 24M, 24C, and 24K for exposure scanning the surface of the photoconductive drum. In addition, each image creating unit includes well-known components, such as a charger, developer, and cleaner (each of which is not designate by a reference sign) as well as a corresponding one of first transfer rollers 26Y, 26M, 26C, and 26K.

The sheet feeder device 16 includes a paper cassette 28 for storing recording sheets, a pickup roller 30 for picking up the recording sheets one by one from the paper cassette 28, and a pair of registration rollers 34 for adjusting the timing to feed a recording sheet to a second transfer roller 32, which will be described later.

Each of the photoconductive drums 22Y . . . 22K is exposed to light from a corresponding one of the LED arrays 24Y . . . 24K after having been cleaned by the cleaner to remove residual toner from the drum surface and uniformly charged by the charger. When the photoconductive drum having been uniformly charged is exposed to the light, an electrostatic latent image is formed on the drum surface.

Each electrostatic latent image is developed by the developer of a corresponding color, so that toner images in colors Y, M, C, and K are formed on the surface of the photoconductive drums 22Y . . . 22K. Then, by the action of electrostatic force imposed by the first transfer rollers 26Y . . . 26K each disposed at a corresponding transfer position on the rear surface of the transfer belt 4, the toner images of the respective colors are sequentially transferred onto the transfer belt 4.

At this time, the image creation units of the respective colors sequentially operate in the order starting from the one located at the upper stream to the lower stream with adjusted timing, thereby to ensure that the images in the respective colors are transferred at the same position on the running transfer belt 4.

In the meantime, the sheet feeder device 16 feeds a recording sheet from the paper cassette 28 in timed relation to the operation of the image creation units. The recording sheet is then transported to the position at which the second transfer roller 32 faces the drive roller 6 (hereinafter, this position is referred to as "second transfer position").

At the second transfer position, the full color toner image on the transfer belt 4 is further transferred (in the process of second transfer) to the recording sheet by the action of electrostatic force imposed by the second transfer roller 32.

The recording sheet having the toner image transferred thereon is further transported to the fusing unit 18. The fusing unit 18 applies heat and pressure to the recording sheet to cause toner particles on the surface of the recording sheet to be fused and fixed. Thereafter, the recording sheet is ejected onto a paper exit tray 38 by a pair of paper exit rollers 36.

The fusing unit 18 is configured to be removable from the main body of the printer 2. The housing 20 is provided with a door 20A that can be freely opened and closed at the upper right in the figure. With the door 20A being left opened, the fusing unit 18 is removed from or attached to the main body of the printer 2 by moving the fusing unit 18 in the directions indicated by a double-headed arrow A.

Fusing Unit

Figure 2A:
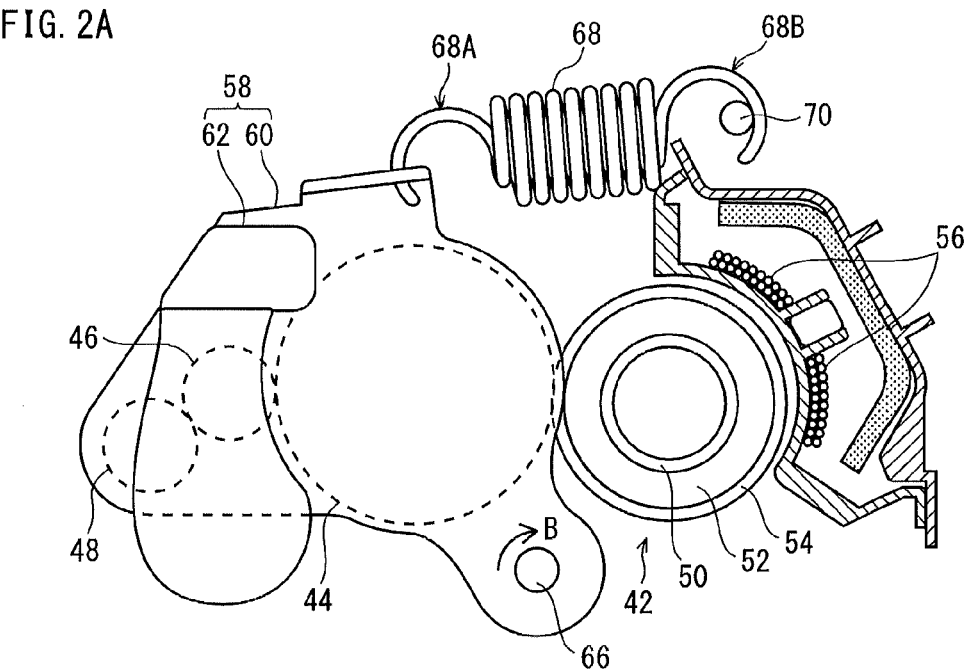
FIGS. 2A and 2B are views showing part of a fusing unit installed in the printer.
Figure 2B:
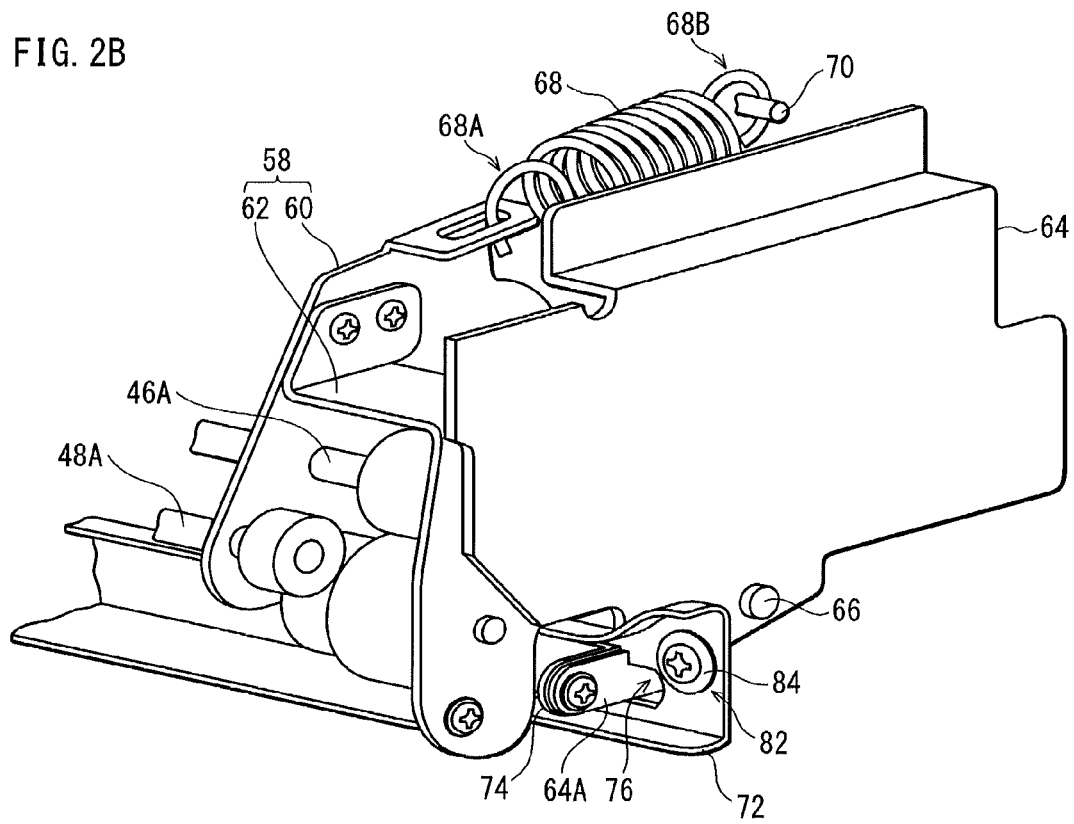

FIG. 2A shows the structure of an important part of the fusing unit 18, whereas FIG. 2B shows part of the frame structure of the fusing unit 18. Note that FIGS. 2A and 2B show the fusing unit 18, as viewed from the rear of the printer 2.

The fusing unit 18 is of an IH (induction heating) type. As shown in FIG. 2A, the fusing unit 18 includes a fusing roller 42, a pressing roller 44, a heat equalizing roller 46, and a brush roller 48.

The fusing roller 42 is composed of a hollow metal core 50 and an elastic layer 52 and an electromagnetic induction heating layer 54 that are laminated on the metal core 50 in the stated order.

Partly along an outer peripheral surface of the fusing roller 42, an IH coil 56 is disposed. By the action of the variable magnetic field generated by the IH coil 56, eddy currents are induced in the electromagnetic induction heating layer 54 to generate heat by Joule heating. As a result, the electromagnetic induction heating layer 54 is directly heated.

The pressing roller 44 is composed of a hollow metal core and an elastic layer and a releasing layer (neither is shown in the figure) that are laminated on the metal core in the stated order.

The heat equalizing roller 46 is disposed in contact under pressure with the pressing roller 44 and evenly distributes heat of the pressing roller 44 in the axial direction to equalize the surface temperature.

The brush roller 48 is composed of a metal core with bristles (neither is shown in the figure) implanted to extend from the roller surface. By rubbing the surface of the heat equalizing roller 46, the brush roller 48 cleans the roller surface.

The three rollers, namely, the pressing roller 44, the heat equalizing roller 46, and the brush roller 48, are rotatably supported on a movable frame 58 made with sheet metal. The movable frame 58 includes a first frame 60 supporting the three rollers mentioned above and also includes a second frame 62 supporting the shafts of gears constituting part of the force transmission system for driving the three rollers to rotate. As shown in FIG. 2B, the second frame 62 is bent (turned) to define a hook shape and fixed to the first frame 60 at one turned end. In FIG. 2B, the reference signs 46A and 48A denote the rotating shafts coupled to the ends of the heat equalizing roller 46 and the brush roller 48 (both not shown in FIG. 2B), respectively. In addition, the pressing roller 44 is omitted in FIG. 2B.

The first frame 60 is swingably attached to a shaft 66 that is supported by a fixed frame 64 (see FIG. 2B). This configuration allows the entire movable frame 58 to swing on the shaft 66.

To the first frame 60, a hook 68A provided at one end of a tension spring 68 is fixed. A hook 68B provided at the other end of the tension spring 68 is fixed to a pin 70 that in turn is attached to a frame not shown in the figure.

By the resilient force of the tension spring 68, the first frame 60 moves angularly about the shaft 66 in the direction of the arrow B. As a result, the pressing roller 44 attached to the first frame 60 is pressed against the fusing roller 42, whereby a nip is formed at a contact portion between the rollers 44 and 42. A toner image on a recording sheet is fixed as the recording sheet passes through the nip.

Yet, during the time no image formation takes place (during the time fusing of toner images by the fusing unit 18 is not performed), the first frame 60 is moved angularly in the direction opposite to that indicated by the arrow B by a known separation mechanism (not shown) that includes a cam and the like. In this way, the pressing roller 44 is moved to a position clear of the fusing roller 42.

The fixed frame 64 is fixed to a frame 72 that is a major frame of the fusing unit 18 (hereinafter, the frame 72 is simply referred to as the "main frame 72"). The fixed frame 64 has a tongue 64A horizontally extending from the lower edge of the fixed frame 64. The fixed frame 64 is fixed to the main frame 72 at the tongue 64A by a mounting member 74, which will be described later.

Figure 3A:
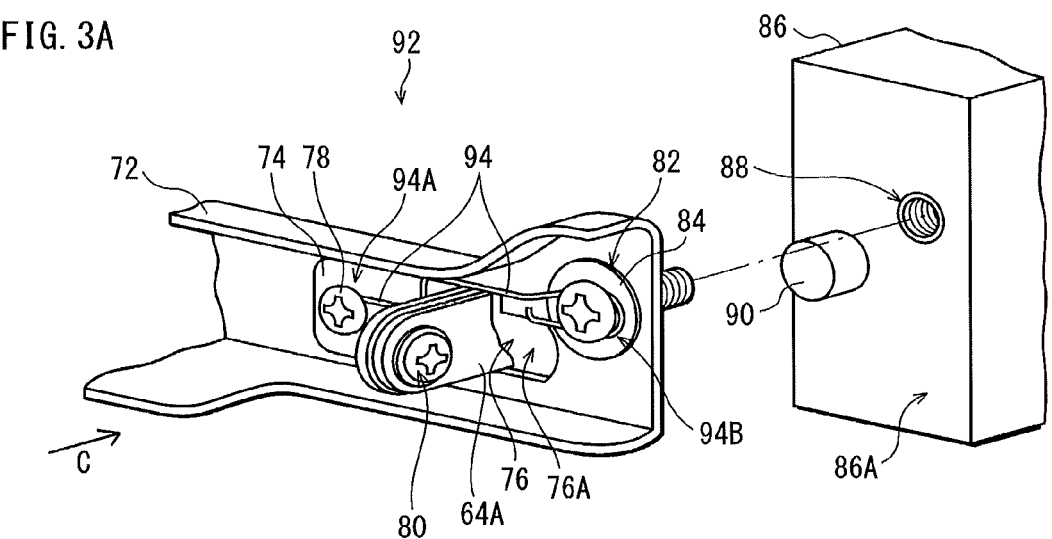
FIGS. 3A and 3B are views showing an example of part of the fusing unit attached to the printer.
Figure 3B:
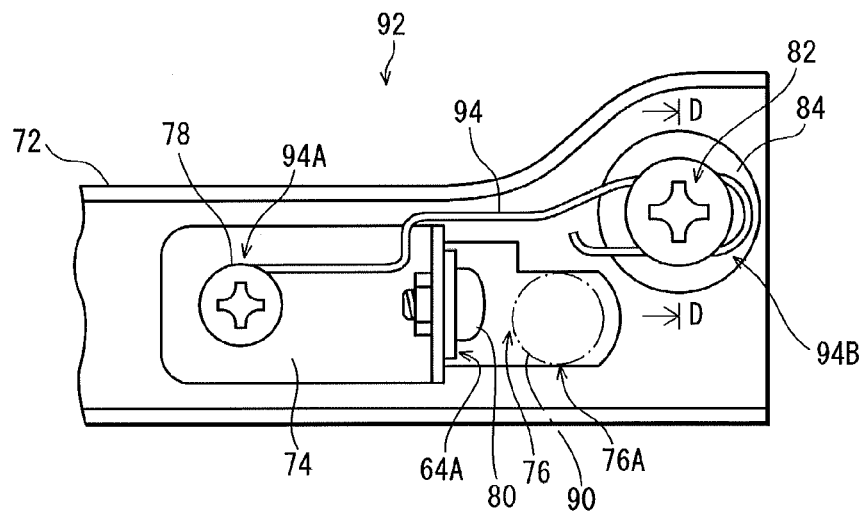

The following further describes how the fixing is done with reference to FIGS. 3A and 3B.

FIG. 3A is an oblique view showing an end portion of the main frame 72 where the mounting member 74 is provided, whereas FIG. 3B is a front view of the end portion as seen from the direction of an arrow C.

The main frame 72 is composed of an elongated angle metal having a squared U-shape cross section. The main frame 72 extends substantially entirely across the fusing unit 18 in the lateral direction as seen from the direction indicated by the arrow C in FIG. 3A (i.e., as seen from the front). The main frame 72 is bilaterally symmetrical in overall shape, except for a window 76 described below.

The main frame 72 has the window 76 opened through the end portion thereof and the tongue 64A is inserted through the window 76. A portion constituting a substantially right-half of the window 76 has such dimensions that the distance between the straight inner edges opposing in the vertical direction in the figure is long enough to allow a pin 90 to be inserted smoothly without vertical rattling. Note that a description of the pin 90 will be given later. The portion of the window 76 having the specific distance described above is referred to as a positioning portion 76A. In addition, the mounting member 74 made of an angle metal defining an L shape is secured to the main frame 72 by a screw 78. That is, the mounting member 74 has a portion bent to upright from the main frame 72. This upright portion of the mounting member 74 is fastened to the tongue 64A by a screw 80, whereby the fixed frame 64 (see FIG. 2B) is fixedly secured to the main frame 72.

The fusing unit 18 is attached to the printer 2, by fastening the main frame 72 to the main body of the printer 2 using a screw 82.

Figure 4A:
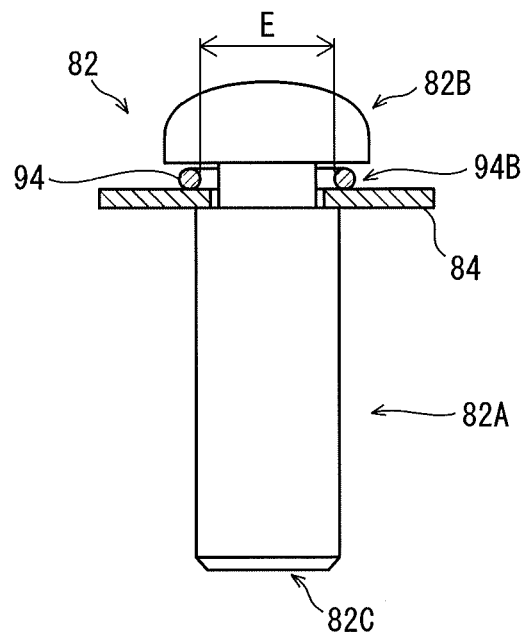
FIGS. 4A and 4B are views each showing a screw used for securing the fusing unit to the main body of the printer.

The following now describes the screw 82 with reference to FIG. 4A. The screw 82 is a pre-assembled screw and washer assembly. More specifically, the screw 82 has a washer 84 (a flat washer, in this example) pre-assembled so as to be held along a portion of the screw shank that is located between a head 82B and a threaded portion 82A. The washer 84 has an inner diameter smaller than the outer diameter of the threaded portion 82A.

Referring back to FIGS. 3A and 3B, the printer 2 includes a frame 86 for fixedly securing the fusing unit 18 (hereinafter, the frame 86 is referred to as a "main-body frame"). The main-body frame 86 has a mounting surface 86A for attaching the fusing unit 18 thereon, and a tapped hole 88 is formed in the mounting surface 86A. In addition, a cylindrical pin 90 for position (hereinafter, "positioning pin 90") projects from the mounting surface 86A.

On the other hand, the main frame 72 of the fusing unit 18 has a through hole (hereinafter, "insertion hole") not shown in FIGS. 3A and 3B. The insertion hole is larger than the outer diameter (nominal diameter) of the screw 82 and smaller than the outer diameter of the head 82B (see FIG. 4A).

The screw 82 passed through the insertion hole is fasted into the tapped hole 88 to make thread engagement, so that the main frame 72 firmly sandwiched between the screw head 82B and the mounting surface 86A. As a result, the fusing unit 18 is secured to the main body of the printer 2. At this time, the positioning pin 90 is brought into alignment with the positioning portion 76A of the window 76 to ensure that the main frame 72 and, by extension, the fusing unit 18 to be properly positioned relatively to the printer 2 in the vertical direction. Note that the left-end portion of the main frame 72 as seen from the direction of the direction of the arrow C (as seen from the front) is not shown in FIG. 3A. Yet, the left-end portion of the main frame 72 is fastened to the main-body frame 86 in a similar manner to the right-end portion described above and shown in FIG. 3A. Note that a portion of the main-body frame 86 to be secured to the left-end portion of the main frame 72 is configured similarly to a portion, as shown in FIG. 3A, to be fastened to the right-end portion of the main frame 72.

In addition, the main frame 72 has a circular hole (not shown) formed through the left-end portion. This circular hole is for positing in the vertical and horizontal directions. By inserting the positioning pin (not illustrated) provided on the main body of the printer 2 into the circular hole, the main frame 72 and, by extension, the fusing unit 18 is appropriately positioned relatively to the main body of the printer 2 in the vertical direction as well as in the horizontal direction.

To remove the fusing unit 18 from the main body of the printer 2, first, the screw 82 is loosened to detach the screw 82 from the main-body frame 86. To prevent the screw 82 from falling out of the insertion hole, a structure for preventing fall of the screw 82 is provided.

Screw Fall Preventing Structure

The following describes a screw fall preventing structure according to the present embodiment, by way of four examples.

Example 1

The following describes a screw fall preventing structure 92 of Example 1, with reference to FIGS. 3A and 3B.

The screw fall preventing structure 92 includes a piece of wire 94. The wire 94 is fixed at one end portion (hereinafter, "fixed end portion 94A") to the main frame 72 by being sandwiched between the mounting member 74 and the head of the screw 78, which is a fixing member. The wire 94 is a metal wire, such as stainless steel, and has resilience (elasticity).

The other end portion (the end portion opposite from the fixed end portion 94A) of the wire 94 is turned back to define a U-shaped bend to form a retaining portion 94B for retaining the screw 82.

Figure 4B:
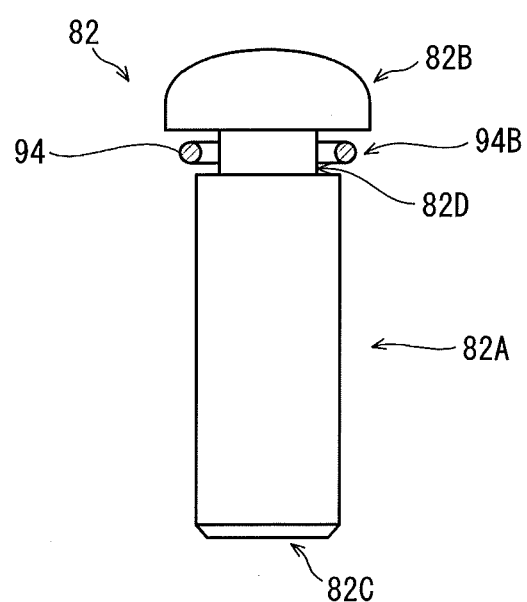

FIG. 4A is a sectional view taken along the line D-D in FIG. 3B to exclusively show the wire 94 and the pre-assembled screw 82 having the washer 84. With reference to FIG. 4B, the following further describes the retaining portion 94B.

The U-shaped bent portion of the wire 94 has an inner width E not allowing the screw head 82B to pass through. The washer 84 constitutes a flange portion projecting outwardly between the screw head 82B and the screw end portion 82C. Needless to say, the outer diameter of the washer 84 is larger than that of the screw head 82B. Therefore, the washer 84 is prevented from passing through the retaining portion 94B formed by the bending described above.

As described above, the retaining portion 94B is formed by bending the wire 94 and receives a shank portion of the screw 82 therein. The screw 82 is therefore held to be freely rotatable on its axis.

Referring back to FIGS. 3A and 3B, the screw 82 is elastically supported by the wire 94, or more precisely by the portion between the retaining portion 94B and the fixed end portion 94A which is secured by the screw 78. The above configuration offers various advantages. For example, consider the case where the screw 82 is not fastened and therefore the fusing unit 18 (the main frame 72) is not secured to the printer 2 (the main-body frame 86) (that is, the fusing unit 18 has been removed from the printer 2). Even if the screw 82 is accidentally hit by a some kind of object with great impetus in the axial direction, the elasticity of the wire 94 permits the screw 82 to be axially displaced without being detached from the fusing unit 18 (the main frame 72).

In another example, consider the operation of attaching the fusing unit 18 (the main frame 72) to the printer 2 (main-body frame 86). Even if the screw 82 is slightly out of axial alignment with the tapped hole 88, the screw 82 is allowed to move in axially parallel relation with the insertion hole 88 within the range allowed by the clearance in the insertion hole around the shank portion of the screw. As a consequence, it is avoided as much as possible that the screw 82 is inserted (screwed) into the tapped hole 88 at an angle. The parallel movement is made possible by the elasticity (resilience) provided by a portion of the wire 94 between the fixed end portion 94A and the retaining portion 94B and also by the clearance between the shank portion of the screw 82 and the inner edge surface of the retaining portion 94B.

In addition, since the main frame 72 is provided with the positioning portion 76A at one end portion and with the positioning portion (circular hole) at the other end portion, a relatively long distance is secured between the two positing portions. This is advantageous to accurately fix the fusing unit 18 to the printer 2.

In Example 1 above, the washer 84 is used as a stopper for limiting the movement of the retaining portion 94B toward the screw end portion 82C. However, this is merely one example without limitation and various alternatives including the following are possible.

That is, as shown in FIG. 4B, the shoulder of the threaded portion 82A that constitutes a flange portion projecting radially outwardly between the screw head 82B and the screw end portion 82C may be used as the stopper. Then, the retaining portion 94B is fitted over a cylindrical portion 82D of the screw 82. The cylindrical portion 82D is a non-threaded portion of the screw shank and located between the screw head 82B and the threaded portion 82A.

Note that the same description regarding the stopper for limiting the movement of the retaining portion in the axial direction of the screw 82 applies to the retaining portions in Examples 2-4 described below.

Example 2

Figure 5A:
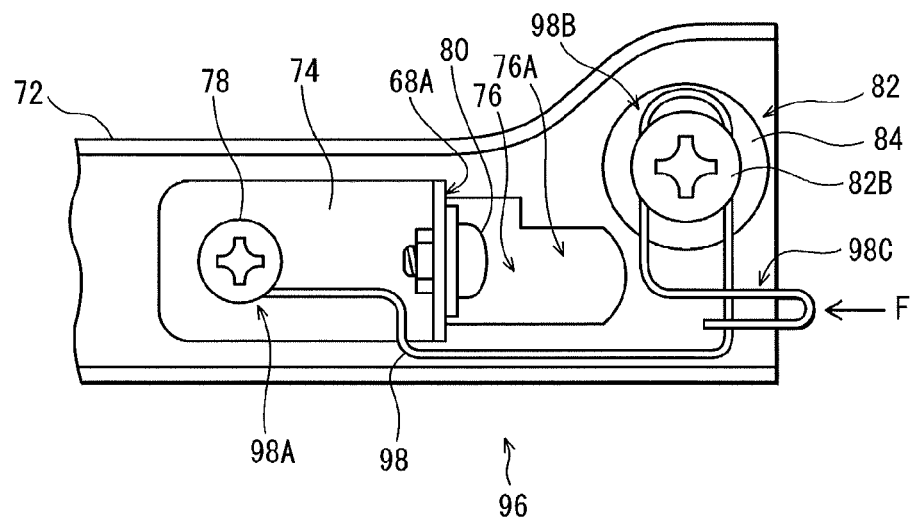
FIGS. 5A and 5B are views showing an example of part of the fusing unit attached to the printer.
Figure 5B:
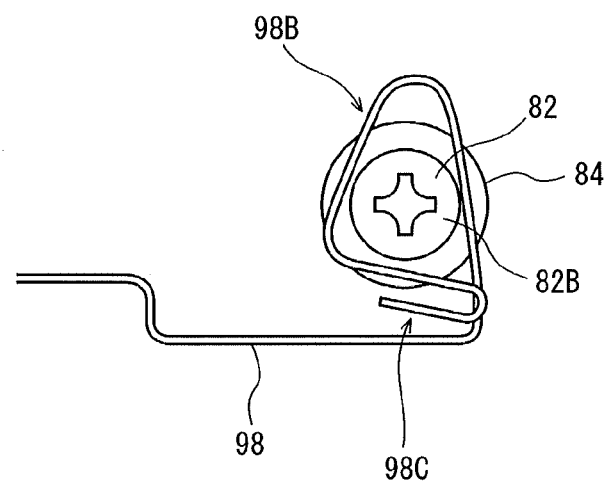

The following describes a screw fall preventing structure 96 of Example 2, with reference to FIGS. 5A and 5B.

Note that the screw fall preventing structure 96 is identical in configuration to the screw fall preventing structure of Example 1, except for the bending of a piece of wire 98 (shape of bends). Thus, the same reference signs are used in FIGS. 5A and 5B to denote the components identical to those shown in FIGS. 3A and 3B. These identical components are mentioned as necessary in the following description without any further explanation.

The wire 98 is fixed at one end portion (fixed end portion 98A) to the main frame 72 by the screw 78.

The wire 98 has a retaining portion 98B formed by turning back the wire 98 to form a U-shape bend at an intermediate location, rather than at an end. Needless to say, the retaining portion 98B is for retaining the screw 82 rotatably on its axis.

The wire 98 further has a projecting portion 98C formed at the free end, by turning back a portion continued from the retaining portion 98B (from one end of the U-shaped portion). The projecting portion 98C projects in the direction that crosses (over or under) the axis of the screw 82.

By pressing the projecting portion 98C in the crossing direction (the direction indicated by an arrow F), the retaining portion 98B (the U-shaped portion) is flexed to enlarge as shown in FIG. 5B, to a size allowing the screw head 82B to pass. This improves the workability of attaching the screw 82 to the retaining portion 98B (the wire 98). Naturally, the workability of removing the screw 82 to the retaining portion 98B (the wire 98) also improves.

Example 3

Figure 6:
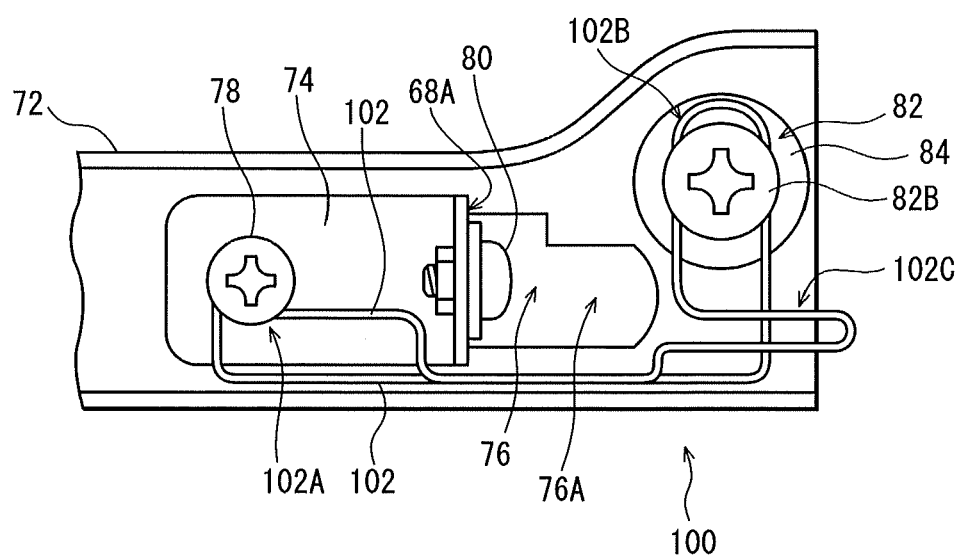
FIG. 6 is a view showing an example of part of the fusing unit attached to the printer.

The following describes a screw fall preventing structure 100 of Example 3, with reference to FIG. 6.

Note that the screw fall preventing structure 100 is identical in configuration to the screw fall preventing structures of Example 1 and 2, except for the bending of a piece of wire 102 (shape of bends). Thus, the same reference signs are used in FIG. 6 to denote the components identical to those shown in FIGS. 3A, 3B, 5A, and 5B. These identical components are mentioned as necessary in the following description without any further explanation.

In the screw fall preventing structure 100, the wire 102 has been bent such that both the ends thereof are located at the position for fixing by the screw 78. The screw 78 fixes both the ends of the wire 102 to the main frame 72 with its head, in a manner that the ends of the wire 102 are not exposed. Thus, in Example 3, the wire 102 has two fixed end portions 102A. This configuration eliminates undesirable possibilities of injuring a finger with an exposed wire end at the time of attaching or removing the fixing unit 18 to or from the main body of the printer 2.

Similarly to Example 2, the wire 102 has a retaining portion 102B for retaining the screw 82 in place and also has a projecting portion 102C for enlarging the retaining portion 102B.

Example 4

Figure 7:
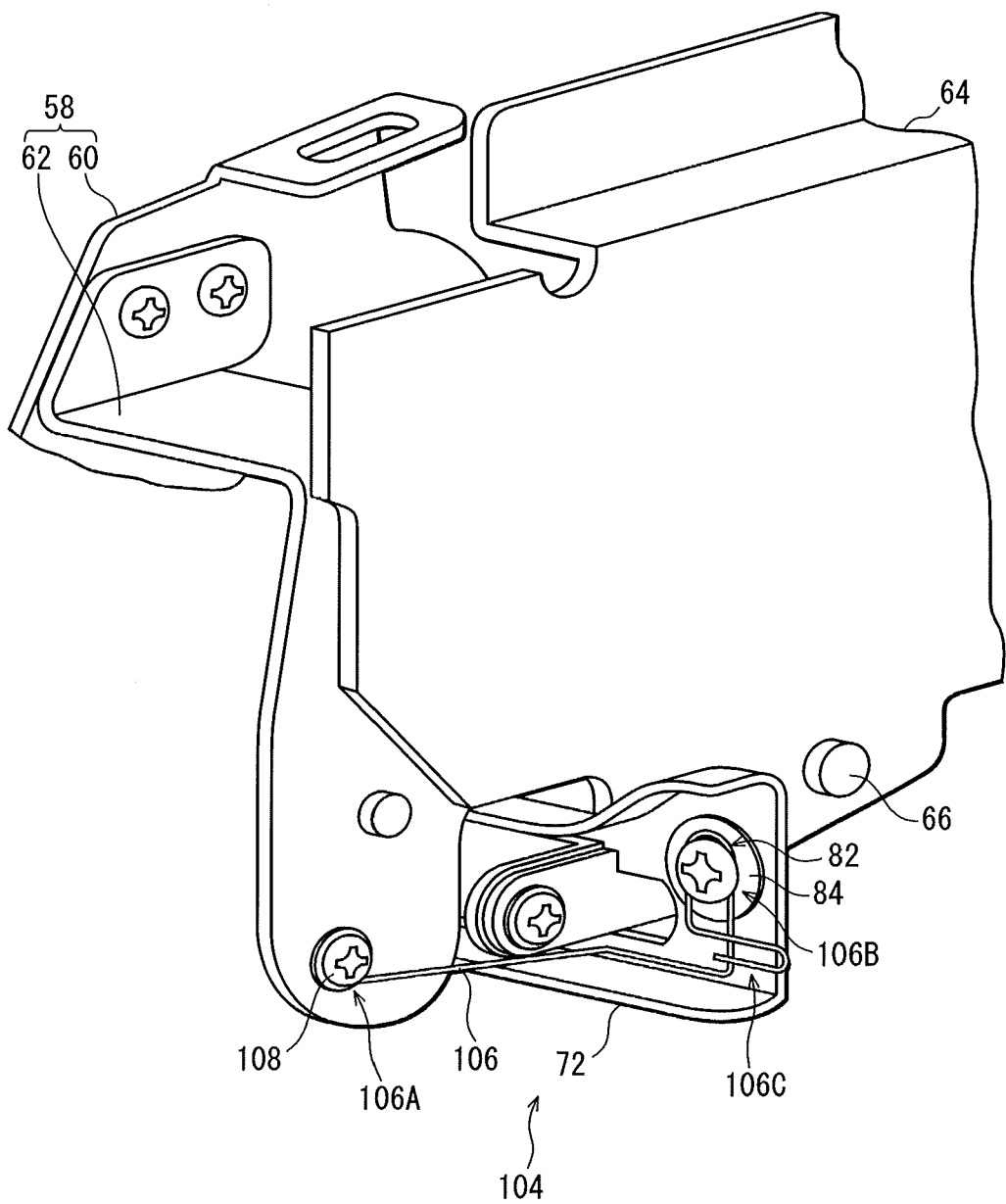
FIG. 7 is a view showing an example of part of the fusing unit attached to the printer.

The following describes a screw fall preventing structure 104 of Example 4, with reference to FIG. 7.

FIG. 7 is a view extracted from FIG. 2B to show part relevant to explanation of Example 4.

Note that the screw fall preventing structure 104 is identical in configuration to the screw fall preventing structures of Examples 1-3, except for the bending of a piece of wire 106 (shape of bends). Thus, the same reference signs are used in FIG. 7 to denote the components identical to those of Examples 1-3. These identical components are mentioned as necessary in the following description without any further explanation.

In Examples 1-3, the wire is fixed to the main frame 72 (at the fixed end portions 94A, 98A, and 102A). In Example 4, the wire is fixed to the second frame 62 of the movable frame 58 (at a fixed end portion 106A) for the following reason.

That is, the movable frame 58 supports the pressing roller 44 rotatably as described above. In the case where the bearing for receiving the shaft of the roller 44 is a sliding bearing made of resin, charging occurs through friction between the shaft and the bearing and the pressing roller 44 tends to be electrified. As a consequence, toner particles before fusing may be scattered, which results in image noise. As indicated by its name, the movable frame 58 is not fixed. Therefore, charges built up on the movable frame are not easily released to other components.

In view of this, in Example 4, the wire 106 is fixed at one end portion to the movable frame 58, which helps the charges built up on the movable frame 58 to be released through the wire 106 to the main frame 72 and also to the main-body frame 86 (that is, the movable frame 58 is grounded to the main body).

Similarly to Examples 2 and 3, the wire 106 has a retaining portion 106B for retaining the screw 82 in place and also has a projecting portion 106C for enlarging the retaining portion 106B. Slimily to Example 3, Example 4 may be modified so that the wire 106 is extended beyond the projecting portion 106C to reach the screw 108 and that the extended end portion is also fixed to the movable frame 58 (the second frame 62) by the screw 108.

Up to this point, the present invention has been described by way of specific examples. It is naturally appreciated, however, that the present invention is not limited to those specific examples and various modifications including the following may be made.

(1) The above embodiment is directed to a printer but this is merely as an example. The applications of the screw fall preventing structures according to the present invention are not limited to printers. The screw fall preventing structures according to the present invention may be used in any other image forming apparatuses, such as copiers, facsimile machines, or multifunction peripherals which combine those functions for preventing fall of a screw used to fasten a fusing unit to the main body of the apparatus.

Furthermore, the applications of the screw fall preventing structure according to the present invention are not limited to image forming apparatuses and may be used in any other apparatuses and the like in which a removable unit is fastened to a main body by a screw.

(2) According to the above embodiment, the retaining portion that retains the screw 82 to be freely rotatably on its axis is formed by bending the wire to form a U-shaped bent portion. However, the shape of the bent portion is not limited to a U-shape. For example, the bent portion may define a triangle, a rectangle, a polygon, an elliptic, or a circle.

(3) According to the above embodiment, the screw used for fastening the fixing unit (main frame) is a cross-recessed head machine screw. Alternatively, however, the screw may be of any other types.

(4) According to the above embodiment, the screw (screw 78), which is a type of fastener, is used as the fixing member used to fix the end portion(s) of the wire. Alternatively, however, the fixing member may be any other types of fasteners, such as a rivet. In another alternative, the main frame may be provided with a projection so that the end portion(s) of the wire may be wound around the projection to be fixedly secured. In this case, the projection integral with the main frame constitutes the fixing member.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A screw fall preventing structure for preventing a screw from falling out of a unit that is attachable to and removable from a main body of an apparatus, the screw being for fastening the unit to the main body of the apparatus, the screw fall preventing structure comprising:
    a wire piece having a bent portion fitted around the screw to hold the screw to be freely rotatable about its axis; and
    one fixing member fixing the wire piece to the unit, wherein
    when the unit is not fastened by the screw, the screw is elastically supported via the wire piece by the one fixing member, the elasticity given by a portion of the wire between a portion fixed by the one fixing member and the bent portion, and
    both ends of the wire piece are located at a position for fixing by the one fixing member, and the one fixing member fixes the ends of the wire piece to the unit in a manner that the ends of the wire piece are not exposed.

2. The screw fall preventing structure according to claim 1, wherein
    the bent portion of the wire piece has a shape not allowing a head and a flange portion of the screw to pass through, the flange portion being located between the head and a leading end of the screw, and
    the bent portion is fitted around a shank portion of the screw located between the head and the flange portion.

3. The structure according to claim 2, wherein
    the screw is a pre-assembled screw having a captive washer between the head and a threaded portion of the screw, an inner diameter of the captive washer being smaller than an outer diameter of the threaded portion, and
    the washer constitutes the flange portion.

4. The screw fall preventing structure according to claim 2, wherein
    the shank portion is a non-threaded, cylindrical portion,
    a shoulder of a threaded portion of the screw constitutes the flange portion, and
    the bent portion is fitted around the cylindrical portion.

5. The screw fall preventing structure according to claim 2, wherein
    the wire piece has a projecting portion formed by turning back a portion continued from one end of the bent portion, the projecting portion projecting in a direction crossing the axial direction, and
    the wire piece configured so that when the projecting portion is pushed in a direction opposite to the projecting direction, the bent portion enlarges to a size allowing the head of the screw to pass through.

6. The screw fall preventing structure according to claim 1, wherein
the unit is a fusing unit used in an image forming apparatus and for thermally fusing a toner image onto a recording sheet by using a fusing roller,
the fusing unit includes a movable frame made of sheet metal supporting a pressing roller, the movable frame being configured to move the pressing roller between a position clear of the fusing roller and a position at which the pressing roller is pressed against the fusing roller,
the fusing unit has a main frame made of sheet metal and is attached to the image forming apparatus by fastening the main frame to the image forming apparatus by the screw, and
the one fixing member fixes the wire piece to the movable frame.

7. A screw fall preventing structure for preventing a screw from falling out of a unit that is attachable to and removable from a main body of an apparatus, the screw being for fastening the unit to the main body of the apparatus, the screw fall preventing structure comprising:
a wire piece having a bent portion fitted around the screw to hold the screw to be freely rotatable about its axis; and
a fixing member fixing the wire piece to the unit, wherein
when the unit is not fastened by the screw, the screw is elastically supported via the wire piece by the fixing member, the elasticity given by a portion of the wire between a portion fixed by the fixing member and the bent portion,
the wire piece has a projecting portion formed by turning back a portion continued from one end of the bent portion, the projecting portion projecting in a direction crossing the axial direction, and
the wire piece configured so that when the projecting portion is pushed in a direction opposite to the projecting direction, the bent portion enlarges to a size allowing the head of the screw to pass through.

8. The screw fall preventing structure according to claim 7, wherein
the bent portion of the wire piece has a shape not allowing a head and a flange portion of the screw to pass through, the flange portion being located between the head and a leading end of the screw, and
the bent portion is fitted around a shank portion of the screw located between the head and the flange portion.

9. The structure according to claim 8, wherein
the screw is a pre-assembled screw having a captive washer between the head and a threaded portion of the screw, an inner diameter of the captive washer being smaller than an outer diameter of the threaded portion, and
the washer constitutes the flange portion.

10. The screw fall preventing structure according to claim 8, wherein
the shank portion is a non-threaded, cylindrical portion,
a shoulder of a threaded portion of the screw constitutes the flange portion, and
the bent portion is fitted around the cylindrical portion.

11. The screw fall preventing structure according to claim 7, wherein
both ends of the wire piece are located at a position for fixing by the fixing member, and
the fixing member fixes the ends of the wire piece to the unit in a manner that the ends of the wire piece are not exposed.

12. The screw fall preventing structure according to claim 7, wherein
the unit is a fusing unit used in an image forming apparatus and for thermally fusing a toner image onto a recording sheet by using a fusing roller,
the fusing unit includes a movable frame made of sheet metal supporting a pressing roller, the movable frame being configured to move the pressing roller between a position clear of the fusing roller and a position at which the pressing roller is pressed against the fusing roller,
the fusing unit has a main frame made of sheet metal and is attached to the image forming apparatus by fastening the main frame to the image forming apparatus by the screw, and
the fixing member fixes the wire piece to the movable frame.

* * * * *